United States Patent [19]
Dieska et al.

[11] Patent Number: 5,912,632
[45] Date of Patent: Jun. 15, 1999

[54] SINGLE CHIP RF TAG OSCILLATOR CIRCUIT SYNCHRONIZED BY BASE STATION MODULATION FREQUENCY

[75] Inventors: David E. Dieska, Longwood, Fla.; Daniel Joseph Friedman, Tarrytown, N.Y.; Kenneth Alan Goldman, Norwalk, Conn.; Harley Kent Heinrich, Brewster, N.Y.

[73] Assignee: International Business Machines Corporation, Armonk, N.Y.

[21] Appl. No.: 08/780,765

[22] Filed: Jan. 8, 1997

[51] Int. Cl.[6] .............................. H04Q 5/22; H04Q 7/00; H03L 7/00
[52] U.S. Cl. .................................. 340/825.54; 455/31.1; 455/37.1; 331/23; 331/10
[58] Field of Search .......................... 340/825.5, 825.54, 340/825.36, 825.69, 825.72; 342/51; 455/31.1, 37.1, 34.3, 38.3; 331/23

[56] References Cited

U.S. PATENT DOCUMENTS

| | | | |
|---|---|---|---|
| 4,075,632 | 2/1978 | Baldwin et al. | 342/42 |
| 4,786,907 | 11/1988 | Koelle | 342/51 |
| 5,313,198 | 5/1994 | Hirao et al. | 340/825.54 |
| 5,525,991 | 6/1996 | Nagura et al. | 342/42 |

*Primary Examiner*—Michael Horabik
*Assistant Examiner*—Anthony A. Asongwed
*Attorney, Agent, or Firm*—Rodney T. Hodgson

[57] ABSTRACT

A Radio Frequency (RF) transponder (tag), method, and system, whereby the tag has a low current tag oscillator, the oscillation frequency of the tag oscillator set by RF signal from a base station.

28 Claims, 9 Drawing Sheets

SINGLE CHIP RF TAG OSCILLATOR CIRCUIT SYNCHRONIZED BY BASE STATION MODULATION FREQUENCY

FIELD OF THE INVENTION

The field of the invention is the field of Radio Frequency (RF) transponders (RF Tags) which receive RF electromagnetic radiation from a base station and send information to the base station by modulating the load of an RF antenna.

BACKGROUND OF THE INVENTION

RF Tags can be used in a multiplicity of ways for locating and identifying accompanying objects, items, animals, and people, whether these objects, items, animals, and people are stationary or mobile, and transmitting information about the state of the of the objects, items, animals, and people. It has been known since the early 60's in U.S. Pat. No. 3,098,971 by R. M. Richardson, that electronic components on a transponder could be powered by radio frequency (RF) power sent by a "base station" at a carrier frequency and received by an antenna on the tag. The signal picked up by the tag antenna induces an alternating current in the antenna which can be rectified by an RF diode and the rectified current can be used for a power supply for the electronic components. The tag antenna loading is changed by something that was to be measured, for example a microphone resistance in the cited patent. The oscillating current induced in the tag antenna from the incoming RF energy would thus be changed, and the change in the oscillating current led to a change in the RF power radiated from the tag antenna. This change in the radiated power from the tag antenna could be picked up by the base station antenna and thus the microphone would in effect broadcast power without itself having a self contained power supply. In the cited patent, the antenna current also oscillates at a harmonic of the carrier frequency because the diode current contains a doubled frequency component, and this frequency can be picked up and sorted out from the carrier frequency much more easily than if it were merely reflected. Since this type of tag carries no power supply of its own, it is called a "passive" tag to distinguish it from an active tag containing a battery. The battery supplies energy to run the active tag electronics, but not to broadcast the information from the tag antenna. An active tag also changes the loading on the tag antenna for the purpose of transmitting information to the base station.

The "rebroadcast" or "reflection" of the incoming RF energy at the carrier frequency is conventionally called "back scattering", even though the tag broadcasts the energy in a pattern determined solely by the tag antenna and most of the energy may not be directed "back" to the transmitting antenna.

In the 70's, suggestions to use tags with logic and read/write memories were made. In this way, the tag could not only be used to measure some characteristic, for example the temperature of an animal in U.S. Pat. No. 4,075,632 to Baldwin et. al., but could also identify the animal. The antenna load was changed by use of a transistor. A transistor switch also changed the loading of the transponder in U.S. Pat. No. 4,786,907 by A. Koelle.

Prior art tags have used electronic logic and memory circuits and receiver circuits and modulator circuits for receiving information from the base station and for sending information from the tag to the base station.

The continuing march of semiconductor technology to smaller, faster, and less power hungry has allowed enormous increases of function and enormous drop of cost of such tags. Presently available research and development technology will also allow new function and different products in communications technology.

Prior art tags which use a different frequency than that of the base station carrier frequency are disadvantageous in that the tag and base station antennas usually have maximum efficiency if it they are designed for a single frequency.

Prior art battery tags which use the same frequency as that of the base station must modulate the antenna reflectance with a well defined modulation frequency so that the base station can distinguish the modulated reflected signal from the various sources of noise. Prior art battery tags carry an oscillator as part of the circuitry needed to receive and send data between the tag and the base station. This oscillator needs a local frequency standard to fix the tag modulation frequency so that the base station can easily and cheaply receive and demodulate the modulated signal sent by the tag. Such local frequency standards are very expensive and hard to integrate on a monolithic semiconductor chip. The tags require an oscillator which draws a lot of current from the tag power supply, either from a battery tag or a passive tag, which lowers either the life of the battery or the range of the tag, respectively. In addition, the base station may have to adjust to the modulation frequency sent out by the tag, which requires that the base station listens to the tag in the first step of the communication procedure, instead of talking to the tag first. This complicates communication procedures when there are multiple tags in the field. Each tag may be sending signals to the base station with a different modulation frequency, and the signals will interfere.

RELATED APPLICATIONS

Copending patent applications assigned to the assignee of the present invention and hereby incorporated by reference, are:

Ser. No. 08/303,965 filed Sep. 9, 1994 entitled RF Group Select Protocol, by Cesar et. al now U.S. Pat. No. 5,673,037;

Ser. No. 08/304,340 filed Sep. 9, 1994 entitled Multiple Item RF ID protocol, by Chan et. al. now U.S. Pat. No. 5,550,547;

Ser. No. 08/521,898 filed Aug. 31, 1995 entitled Diode Modulator for RF Transponder by Friedman et al. now U.S. Pat. No. 5,606,325;

application submitted Aug. 9, 1996 entitled RFID System with Broadcast Capability by Cesar et al.; and application submitted Jul. 29, 1996 entitled RFID transponder with Electronic Circuitry Enabling and Disabling Capability, by Heinrich et al.

OBJECTS OF THE INVENTION

It is an object of the invention to produce an RF transponder comprising circuits which can be made at low cost. It is a further object of the invention to produce an RF transponder which can be used at high frequencies. It is a further object of the invention to produce an RF transponder with maximum range. It is a further object of the invention to produce an RF transponder with circuits which require very little current. It is a further object of the invention to produce an electronic chip for an RF transponder which can be produced simply with standard semiconductor manufacturing techniques. It is a further object of the invention to produce a communication system for communicating with the RF transponder of the present invention. It is a further object of the invention to produce a system for controlling the communication system using the present invention. It is a further object of the invention to produce a system for using and changing information received from the transponder of the present invention.

SUMMARY OF THE INVENTION

The present invention is to have a passive RF tag with a tag oscillator with an oscillation frequency which the tag can lock to a signal sent from the base station to the tag. An innovative low current oscillator design accomplishes this invention. Innovative low current ancillary circuits are also provided. The preferred signal is the modulation frequency of the modulated RF signal that the base station sends to the tag. In this way, an expensive local frequency standard on the tag is not needed, and an inexpensive oscillator can be constructed solely from the transistors and capacitors which are easily and cheaply made on a single chip RF tag. The base station is also cheaper, since the tag sends information modulated at a frequency related to the modulation frequency of the base station, and the base station does not have to have an expensive oscillator circuit which tracks wide excursions of the tag modulation frequency. The result is better noise performance since the base station looks in a much narrower frequency band for the tag signal than would otherwise be the case with inexpensive oscillator circuits on the tag.

DETAILED DESCRIPTION OF THE INVENTION

Figure 1:
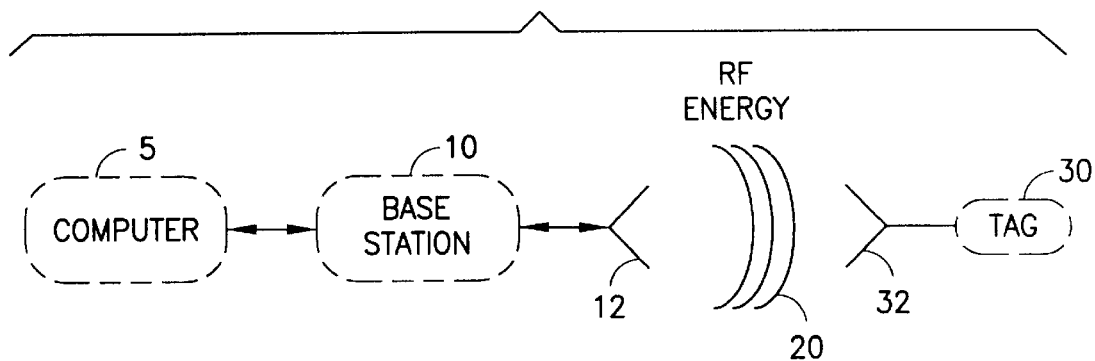
FIG. 1. A system of a base station and an RF tag.

FIG. 1 shows a system of a base station 10 having an associated computer 5 sending RF energy 20 from base station antenna 12 to a tag antenna 32 associated with an RF tag 30. The RF frequency $f_0$ is preferably above 100 MHZ, more preferably above 900 MHZ, and most preferably above 2,300 MHZ. The RF signal is preferably amplitude modulated at a frequency $f_1$ greater than 1 Khz, more preferably between 5 and 150 kHz, and most preferably between 20 and 60 kHz. However, the RF signal may also be modulated by frequency modulation or by phase modulation methods, as is well known in the art of RF signal propagation. The RF tag 30 may be a passive tag which receives all the energy needed to carry out the tag functions from the RF field broadcast by the base station, or it may be an active tag which carries a battery to store the required energy. An active tag may, and a passive tag will, change the loading on the tag antenna 32 to change the antenna reflectivity and thus communicate with the base station 10.

Figure 2:
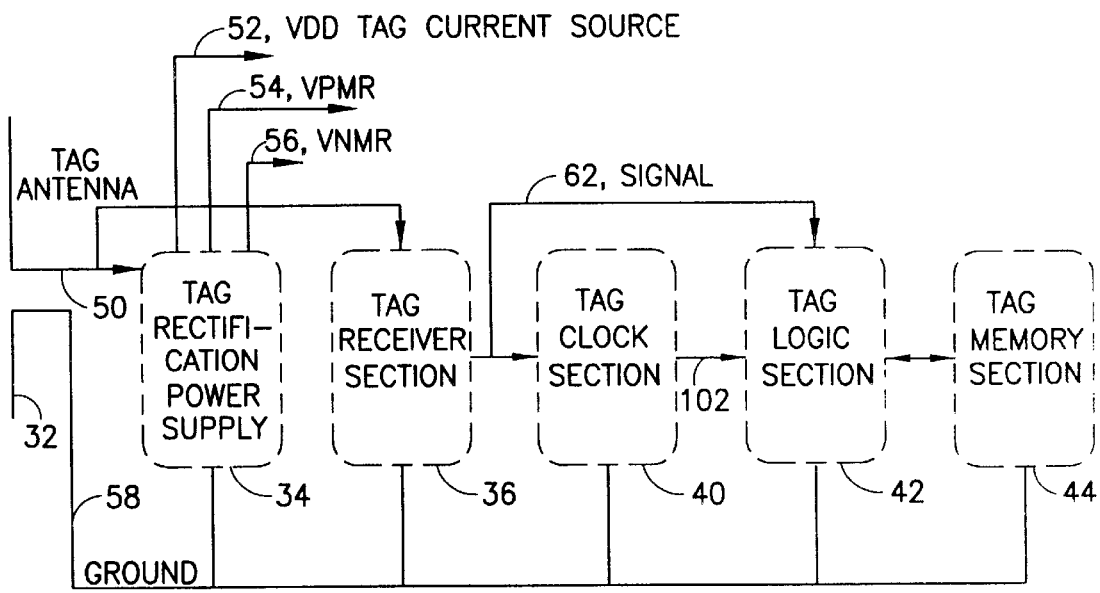
FIG. 2. A block diagram of part of the RF tag.

FIG. 2 shows a block diagram of the tag antenna 32 and part of the RF tag 30. (Neither a possible RF tag transmitter section nor other sections such as measurement sections nor alarm section nor enable/disable sections are shown.) The RF antenna 32 feeds RF power to the tag rectification power supply 34. A battery tag would replace block 34 with a battery (not shown). In the preferred embodiment shown in FIG. 2, a tag rectification signal receiving section 36 comprising an RF diode, a signal capacitor, and a signal capacitor current drain is separate from the tag rectification power supply, but the oscillator section of the invention is also contemplated in the case that section 36 is part of the tag rectification power supply 34. The tag power supply 34 supplies current at voltage VDD on line 52, and optionally supplies voltages VPMR, and VNMR on lines 54 and 56 respectively. These lines are used to power and control the various devices on the tag. The RF antenna 32 has two connections to the tag 30, denoted here by lines 50 and 58. Line 58 is the conventional ground.

The tag rectification signal receiving section 36 receives an RF signal which is preferably amplitude modulated at a frequency $f_1$ from the antenna 32 over line 50, and rectifies and demodulates the RF signal and delivers a digital signal to the rest of the tag electronics over line 62. If the RF is modulated with a steady modulation frequency $f_1$, the output of the signal receiving section 36 is preferably a series of square pulses of unit voltage at a frequency $f_1$. However, any pattern or subpattern in the signal sent out from the base station could be used to generate an output of the signal receiving section 36 in order to adjust the frequency and optionally the phase of the tag oscillator.

The tag clock section 40 receives the digital demodulated digital signal from line 62 and sets the tag oscillator frequency using the modulation frequency $f_1$ of the modulated RF signal as will be explained later.

The tag clock section 40 delivers a digital clock signal on line 102 to the tag logic section 42, to the tag memory section 44, and to other tag electronic sections as needed.

Figure 3:
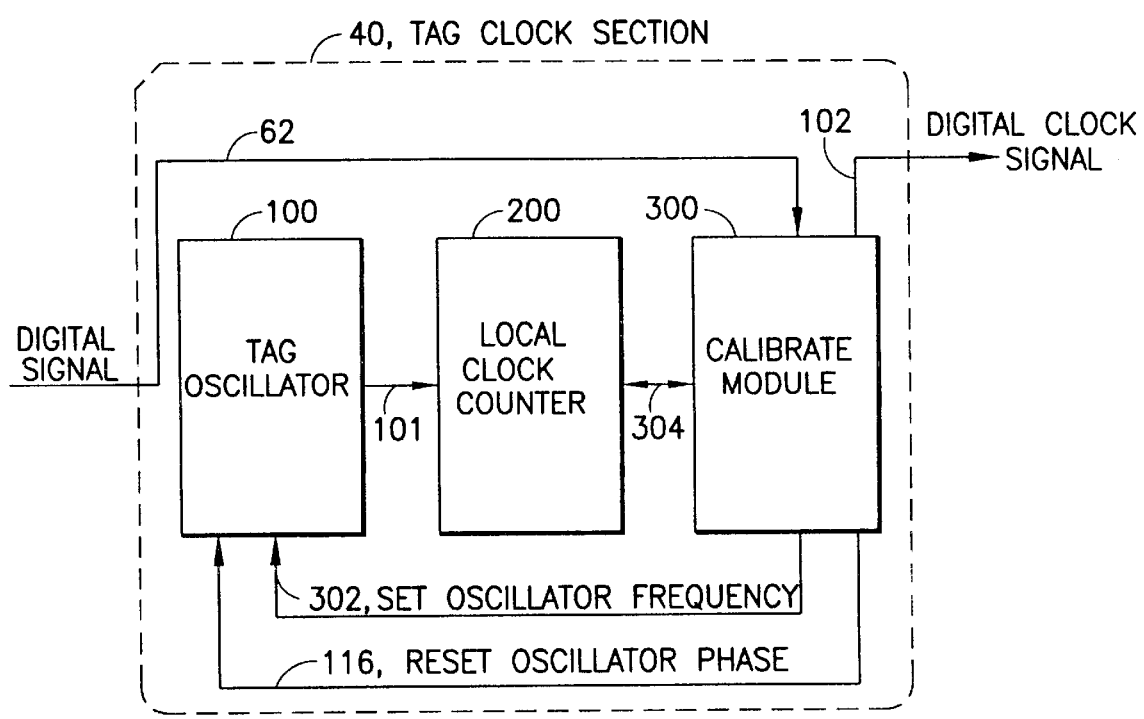
FIG. 3. A block diagram of the tag clock section.

FIG. 3 is a block diagram of the tag clock section 40. The tag oscillator 100 must use less than 500 microamperes of current from the tag power supply 34 in order to avoid drawing down the tag voltage VDD and lowering the range of the tag. It is more preferred that the tag oscillator uses less than 50 microamperes of current. It is even more preferred to have the tag oscillator draw less than 5 microamperes of current when the tag oscillator is oscillating with maximum oscillation frequency, and less than 150 nanoamperes of current when the tag oscillator is oscillating with minimum frequency. In a preferred embodiment, the tag oscillator 100 comprises an oscillator with a block diagram given later in FIG. 4.

The tag oscillator frequency is set by the voltages supplied by a connection denoted 302 from a calibrate module 300. The tag oscillator 100 supplies a local clock signal to the local clock counter 200 over line 101. The local clock counter 200 counts the clock ticks of the local clock signal since the local clock counter 200 has been reset and passes the count to the calibrate module 300 via a connection 304. The calibrate module 300 resets the local clock counter 200 via the connection 304 (and optionally resets the phase of the oscillator 100 over connection 116) on a rising edge of the digital input signal on line 62, and sets the voltages controlling the frequency of oscillator 100 to give a set number of counts between two rising edges of the digital input signal 62 when the base station 10 is sending a steadily modulated RF signal. The calibrate module 300 sends the voltages controlling the frequency of the oscillator 100 over line 302. The oscillator 100 frequency is thus determined by the modulation frequency of the RF energy 20 transmitted by the base station 10. While the calibrate module may carry out its functions using a rising edge of the digital input signal, it is clear to one skilled in the art that the falling edge of the digital signal, or indeed any characteristic of the signal on line 62, may serve as well. The calibrate module sends the digital clock signal to the rest of the tag electronics over line 102.

Figure 4:
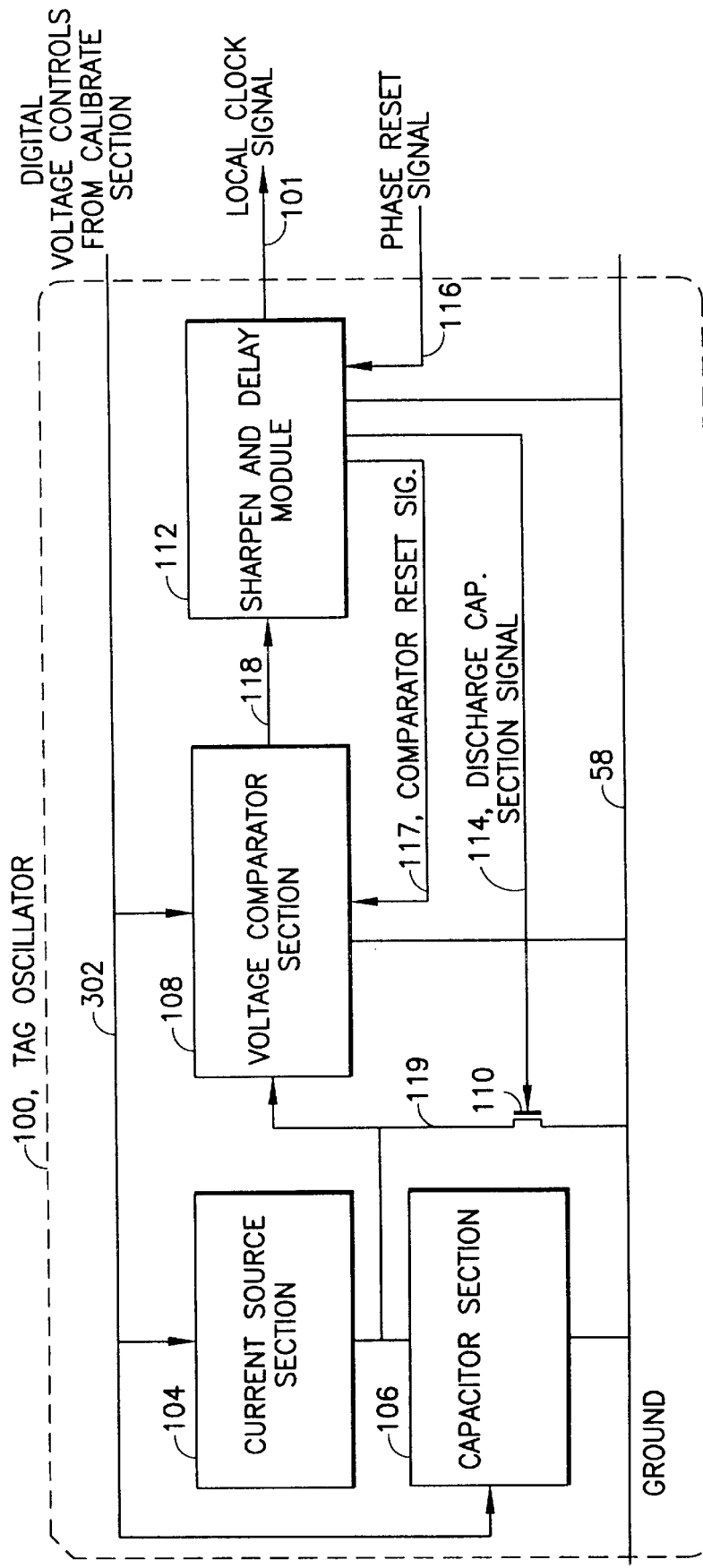
FIG. 4. A block diagram of a preferred tag oscillator.

FIG. 4 is a block diagram for an oscillator section 100. A current source section 104 charges a capacitor section 106. The voltage across capacitor section 106 on line 119 is compared with a reference voltage generated on the chip. The comparison is done in comparator section 108, and when the voltage reaches a preset comparison voltage, the comparator section 108 sends a signal on line 118 down an optional pulse sharpening and delay section 112. When the pulse reaches the end of the pulse sharpening and delay section 112, a local clock signal is sent out on line 101, and a pulse is sent back on line 114 to transistor 110 which discharges capacitor section 106 so that the voltage across capacitor section 106 falls to a low value. Then the voltage starts to build up until it again reaches the preset comparison voltage. The time between two discharges of the capacitor section 106 is the time between two ticks of the local clock. A series of narrow spikes is sent out from the oscillator section on line 101 representing ticks of the local clock.

A phase reset signal is brought in to the sharpen and delay module on line 116 when, for example, the tag detects a rising or falling edge of the digital signal on line 62. The sharpen and delay module 112 then sends a pulse on line 114 to the transistor 110 to both discharge the capacitor section 106 and reset the phase of the local clock signal on line 101. The phase reset signal also serves to clear the sharpen and delay line in the sharpen and delay module 112. A signal is also sent on line 117 to clear the voltage comparator section 108 when the phase reset signal passes through the sharpen and delay line.

One or more of the sections 104, 106, and 108 are digitally controlled by signals from the calibrate module 300 sent out on line 302. These calibrate module outputs are set using base station output modulation patterns. Thus, the tag oscillator frequency is controlled by the signals from the base station to be one of a plurality of possible discrete frequencies. Circuits for analog control of the tag oscillator are anticipated by the inventors, but the digital control is preferred since the circuits required are more stable and require less current.

Figure 5A:
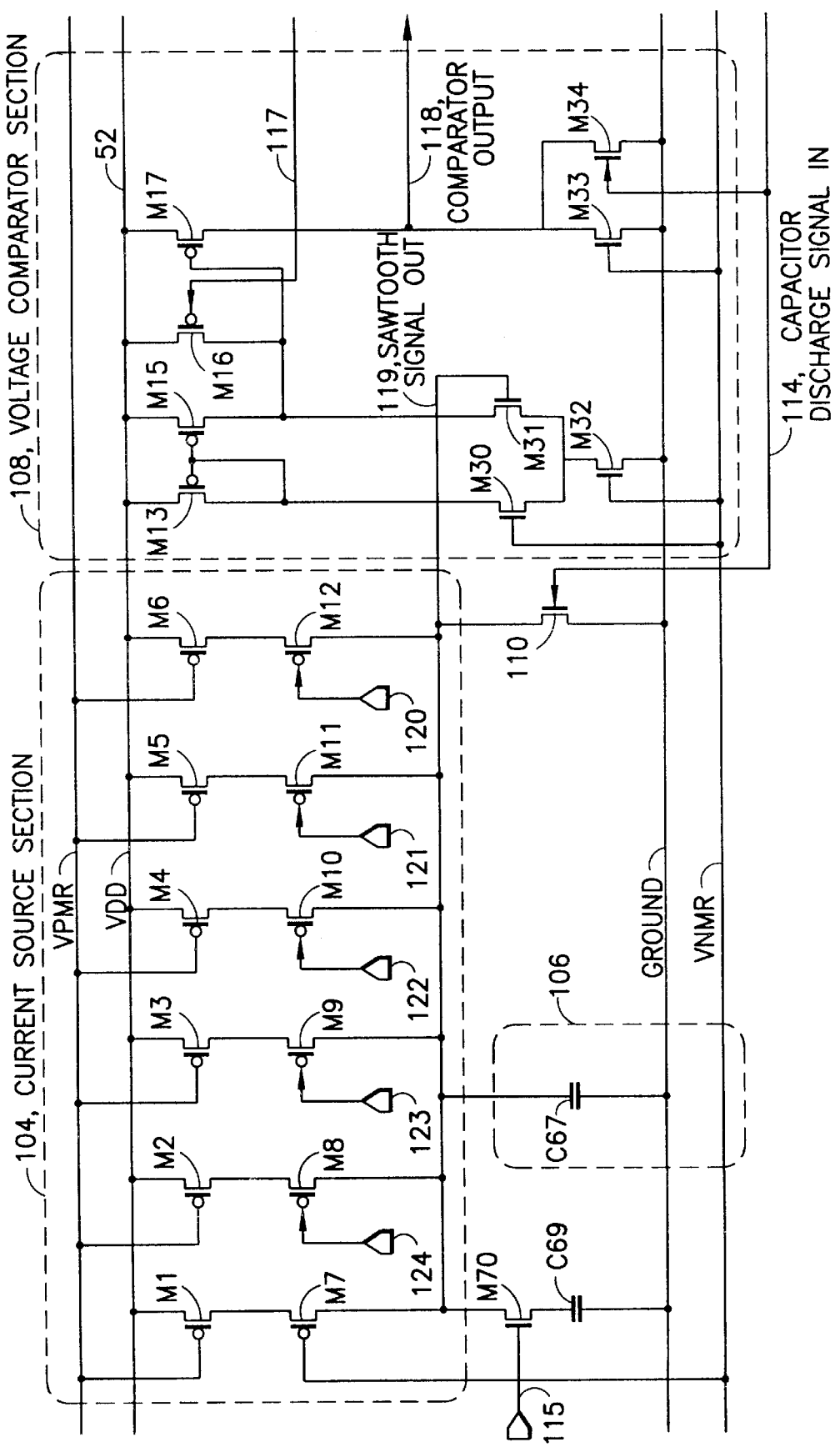
FIG. 5a. and 5b. A circuit diagram for a preferred embodiment of a tag oscillator.

The most preferred embodiment of the oscillator section 100 uses an innovative, very low current source section 104 with the value of the current set by the calibrate module using voltages brought to the current source section 104 on connection 302. FIG. 5a shows a circuit diagram of the most preferred circuit of blocks 104, 106, and 108 which may produce a clock signal running at approximately 8 times the RF modulation frequency $f_1$.

Transistors M2–M6 are each capable of sourcing a defined current on to capacitor C67, depending on whether control transistor switches M8–M12 are on or off. Voltages at nodes 120, 121, 122, 123, and 124 which are set by voltages carried over connection 302, control transistors M8–M12.

Transistor M1 supplies capacitor C67 with a small current from the tag power supply at voltage VDD. This small current is independent of the calibrate module control on line 302. When nodes 120–124 are set high by voltages supplied on connection 302 from the calibrate module 300, transistors M8–M12 do not conduct current. The tag oscillator runs at a relatively low frequency, (since at low current the capacitor C67 charges slowly to the comparison voltage) and the digital clock signal produced on line 102 is used to check whether an unmodulated RF signal is being sent from the base station for a sufficiently long time in the first step of the method of the invention called the preamble detect step. As will be shown later, the system then may calibrate the oscillator by setting voltages on nodes 120–124. When the tag oscillator is running in the slowest mode, the average current draw is only 100 nA, as the current is drawn through most of the devices shown in FIG. 5a and FIG. 5b only for a very short time when there is a transition and a clock pulse is produced. As one or more of the control transistors M8–M12 are turned on, the oscillator runs faster, and the feedback from the calibrate module is used to set the nodes 120–124 so that the oscillation frequency is adjusted with respect to the base station RF modulation frequency.

Transistors M1–M6 are p-FETs controlled by the voltage VPMR, and the current through each transistor mirrors the current through a standard p-FET elsewhere on the chip. In the operating regime of the circuit of FIG. 5, the relative current through each transistor M1–M6 is defined by the geometry of the transistors, as is well known to one skilled in the art of analog integrated circuit design. The currents through transistors M1–M6 are in the ratio 2:1:2:4:8:16 respectively. On the chip, transistors M1–M6 are implemented as multiple devices of the same size. Thus, the transistor with weight 16 is actually 16 identical transistors connected in parallel. (The transistors have dimensions w=5$\mu$×1=10$\mu$ in a preferred implementation.) The current from current source 104 can thus be set at approximately every integral multiple between 2 and 33 of a base current of approximately 35 nA by appropriate adjustment of voltages on nodes 120–124. There are thus 32 different tag oscillator frequencies that can be generated by the tag oscillator 100.

It is clear to one of ordinary skill in the art that more or fewer transistors such as M2–M6 could be used to set more or fewer values of the tag oscillator frequency. It is also clear that the settable frequencies are not necessarily equally distributed through the desired frequency region. It is well within the scope of the invention to have non-integral ratios for the currents from transistors M1–M6 to provide finer control near the most desired frequency, and yet allow wider excursions from the mean of the allowed frequencies. It is also well within the scope of the invention to reverse the p and n channel circuits shown in the figures with equivalent n and p channel circuits. The circuit shown is preferable, however, in that the current supplies are somewhat more stable in an environment where VDD may shift and where the ground is more stable.

An alternative preferred embodiment of the oscillator section 100 uses a capacitor section 106 with a value of the capacitance set by the calibrate module using voltages on connection 302. This embodiment is shown in the circuit diagram of FIG. 6 for the capacitor section 106. In this case, the current source section 104 would preferably comprise one or two p-fet transistors. The digitally controlled capacitor section 106 shown in FIG. 6 runs at the fastest rate when all capacitors $C_1$–$C_5$ are switched off from receiving current from the current source section 104, and the smallest capacitor $C_6$ is used. In this case, the variations in manufacture of the limited current supply transistors and the capacitance $C_6$ would lead to unwanted variations in the maximum tag oscillation frequency. This disadvantage outweighs the advantage that the oscillator draws approximately the same low constant current at all times (although the current used during the transitions may vary greatly with frequency).

An alternative preferred embodiment of the oscillator section 100 uses a comparison voltage in section 108 with a value of the comparison voltage set by the calibrate module using voltages on connection 302. This embodiment is shown in the circuit diagram of FIG. 7 for the voltage comparator section 108. In this case, the current source section 104 would preferably be one or two p-fet transistors, and the capacitance section 106 would be a preferably comprise a single capacitor. This circuit works by providing a controllable way to unbalance the current sources which supply the differential pair in the first stage of the comparator. Unbalancing the current sources serves to move the comparator trip point.

Figure 6:
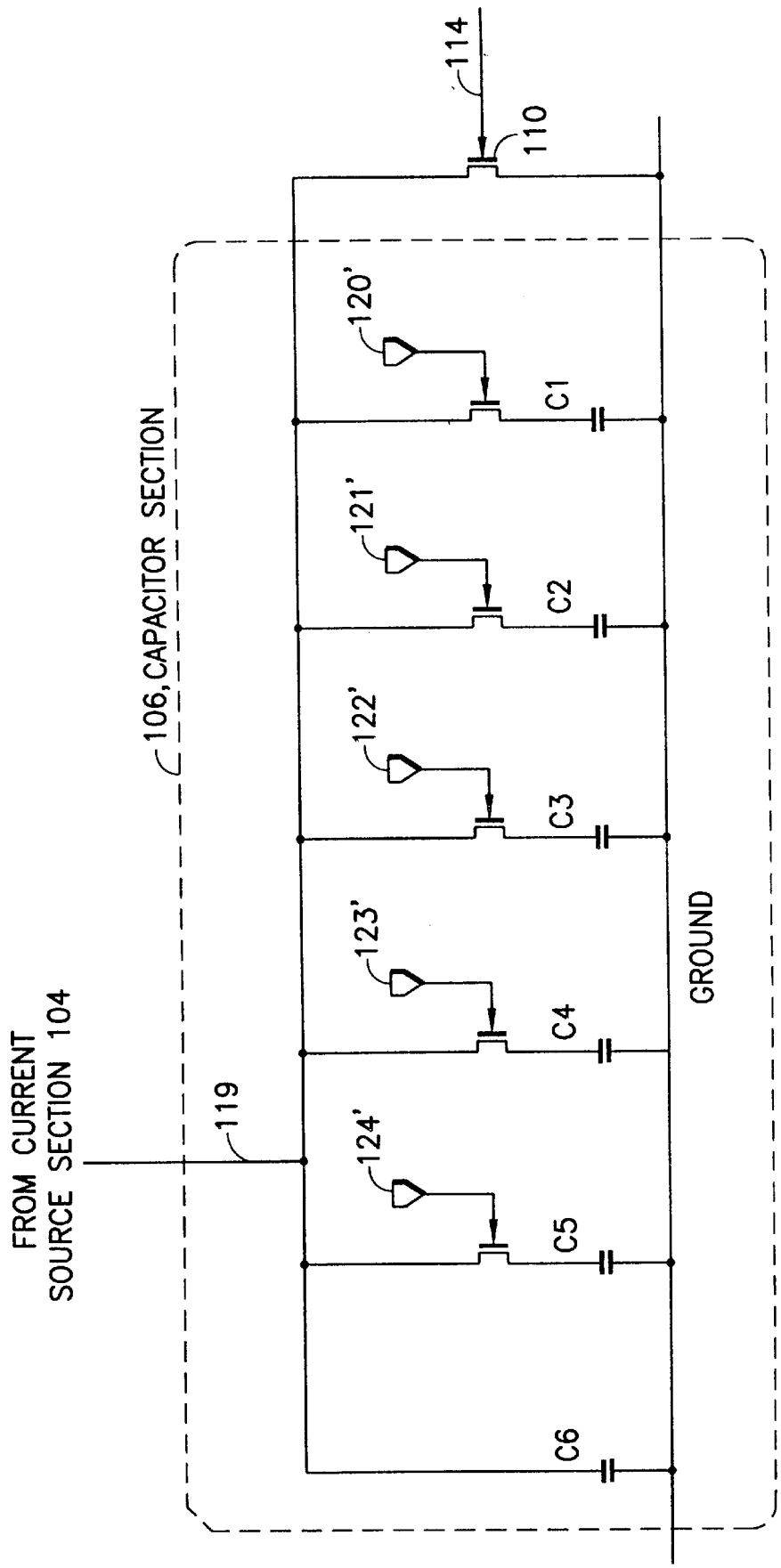
FIG. 6. A circuit diagram for an alternative preferred embodiment of a capacitor section for a tag oscillator.
Figure 7:
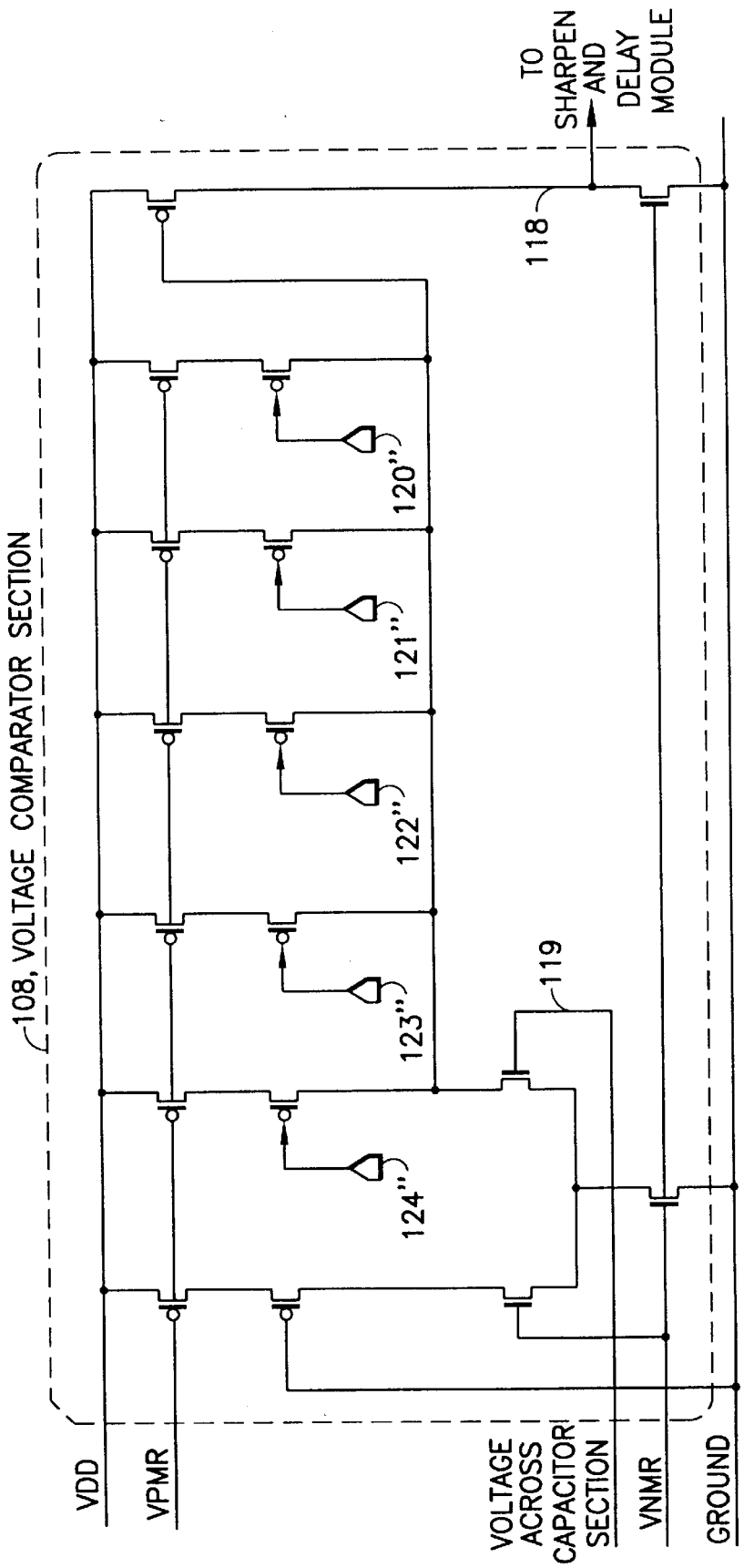
FIG. 7. A circuit diagram for an alternative preferred embodiment of a voltage comparator section for a tag oscillator.

The digitally controlled current source section 104 sketched in the circuit of FIG. 5a is preferred over the digitally controlled capacitance section 106 or the digitally controlled voltage comparator section 108 sketched in FIGS. 6 and 7 respectively. The current is extremely low when the oscillator frequency is low, and the stability and predictability of the oscillation frequency is not as important as when the frequency is raised for the purposes of tag conmmunication. At the higher tag oscillator frequencies, the current draw is higher, and as a result the frequency is much more stable and predictable and is less affected by manufacturing and tag environmental variations.

Transistor M70 and capacitor C69 are optionally included in the oscillator section to slightly slow the oscillator after the oscillation frequency has been set. Thus, the frequency could be set so that there are approximately 9 counts of the clock in every base station modulation frequency interval. M70 can then be turned on, which will guarantee that there are less than 9 counts per interval.

A preferred comparator section 108 is also shown in FIG. 5a. This voltage comparison circuit is well known to one skilled in the art. For example, see page 333 of Allen and Holberg—CMOS Analog Circuit Design (1987).

Figure 5B:
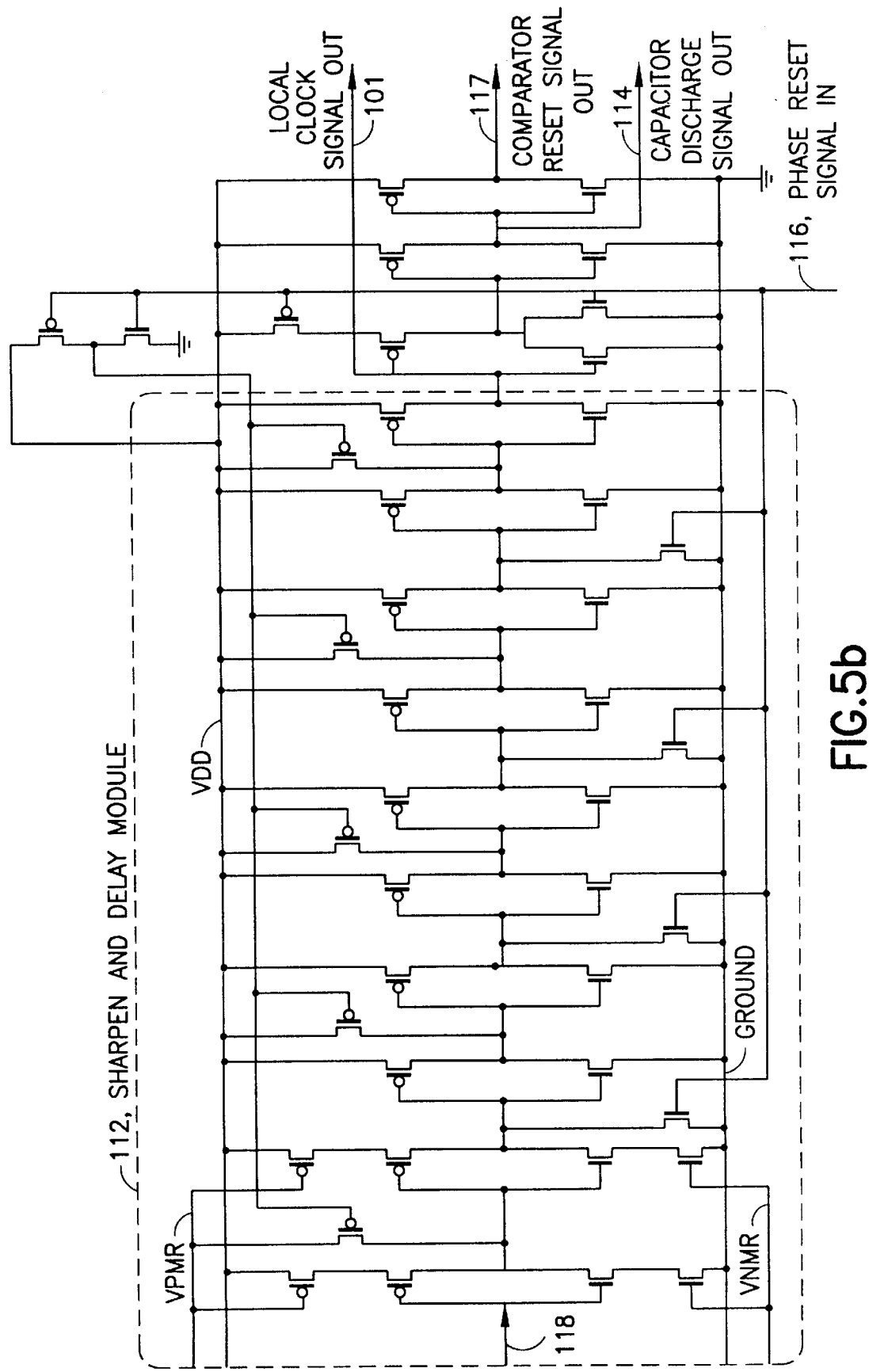

The optional sharpen and delay module 112 circuit is shown in FIG. 5b. While the signal on line 118 could be used as a clock signal for the tag electronics and could be used to discharge capacitor section 106 through transistor 110 if it were connected to line 114, the slow rise time of signal on line 118 would waste current in the digital gate using it as input. Furthermore, the oscillator output spike might be too narrow.

The series of resettable inverter circuits in the sharpen and delay module 112 shown in FIG. 5b serve to delay and sharpen the final pulse applied to line 102. The delay allows us to perform computations on both rising and falling edges of the oscillator output with adequate intervening setup and hold time. The sharpen and delay circuit is also more broadly required to ensure a wide enough clock pulse width for use by the digital electronics on the chip. The sharpen and delay circuit is innovative in that it works at low current due to the current limited early gain stages. The circuit is also innovative in that it is resettable, in that the delay line is cleared of data when an oscillator reset is requested. When the circuit without resettability was tried, it was not reliable.

Figure 8:
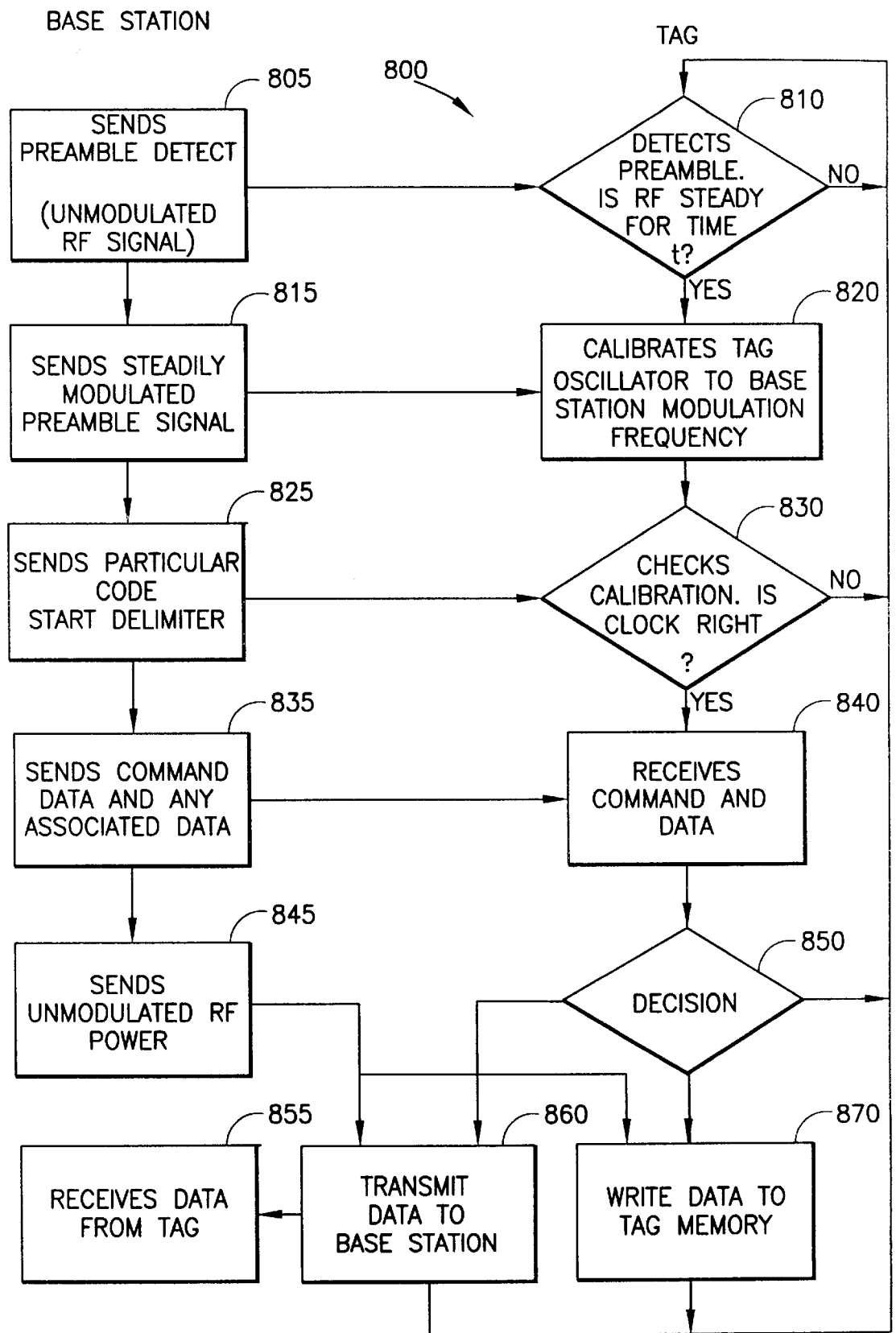
FIG. 8. A flow chart of a preferred method of implementing and using the apparatus of the invention.

FIG. 8 shows a flow chart 800 of a method of implementing and using the apparatus of the invention. In step 805, the base station sends out a steady, unmodulated "Preamble Detect" signal. In step 810 the base station oscillator section is running with the appropriate voltages set on nodes 120–124 so the tag oscillator runs at the slowest frequency allowable. The tag counter is reset on the rising edge of the base station steady, unmodulated signal, and the tag counter counts the clock pulses on line 102. The tag counts the pulses until the next edge of the base station signal and compares the tag counter count to a certain preset number, for example, 8. If the tag counter count is greater than 8, the tag decides that the base station is sending a preamble detect signal, and readies itself for the next step. If the number of counts is less than 8 the tag resets the tag counter and begins again to wait for a long enough time t of steady, unmodulated RF. The waiting period prevents the oscillator from calibrating in the middle of a data transmission, as might occur if a tag enters the base station field during base station communication with another tag.

After the base station has sent a steady RF signal for the required length of time in step 805, the base station in step 815 starts to send a steadily modulated signal where the RF is turned on and off at a frequency $f_1$. At the rising edge of the first modulated pulse, the tag starts the calibration procedure of step 820, and for the next N pulses (where N is an integer) of the steadily modulated RF from the base station, the tag sets the calibration of the tag oscillator so that the tag oscillator frequency is set approximately to a certain multiple of the base station modulation frequency $f_1$. When the base station has sent a sufficient number of pulses in step 815 that the tag has had time to complete step 820, the base station sends a particular modulation pattern called a "Start Delimiter Code" in step 825. The start delnimter code optionally contains pulses that are "too long" in that the RF field is "on" for three times as long as would be the case when the base station were sending a steadily modulated RF signal with modulation frequency $f_1$. This "long pulse" technology is innovative in the field of RF tags. The tag receives the start delimiter code in step 830, using the start delimiter code to check that that the tag oscillator frequency is indeed set correctly and that the tag is decoding valid base station data. Further, the receipt of the start delimiter code ensures that the tag matches the base station's place in the data stream If the start delimiter code is not received correctly, the tag returns to step 810. The tag proceeds to the next step 840 of receiving the command sent by the base station. Meanwhile, the base station now transmits command data in step 835. Such data could be instructions to the tag to write data to the tag memory, to read data from the tag memory and transmit the data to the base station, to set some tag state indicator, or for the tag to perform some other tag function which the particular tag may be able to perform. The tag receives the command data in step 840, and decides in step 850 on the basis of the command data what to do. If the command data is garbled, the tag cannot understand what to do, and returns to step 810 to wait for another try. If the tag does understand the command data, the tag may write data to the tag memory in step 870 or transmit data to the base station in step 860, as examples, and then the tag returns to step 810 to await further orders. During the writing of data to the tag memory 870 or transmitting data to the base station step 860, the base station transmits full power in a steady unmodulated stream of RF power in order to supply power throughout the relatively slow $E^2$-PROM write operation. (If faster memory elements such as ferroelectric random access memory (FRAM) memory elements are used, the tag may write the memory at the same time as the data is received.) The base station receives any data sent from the tag in step 855 which takes place simultaneously with step 845, and then takes further action as appropriate.

Figure 9:
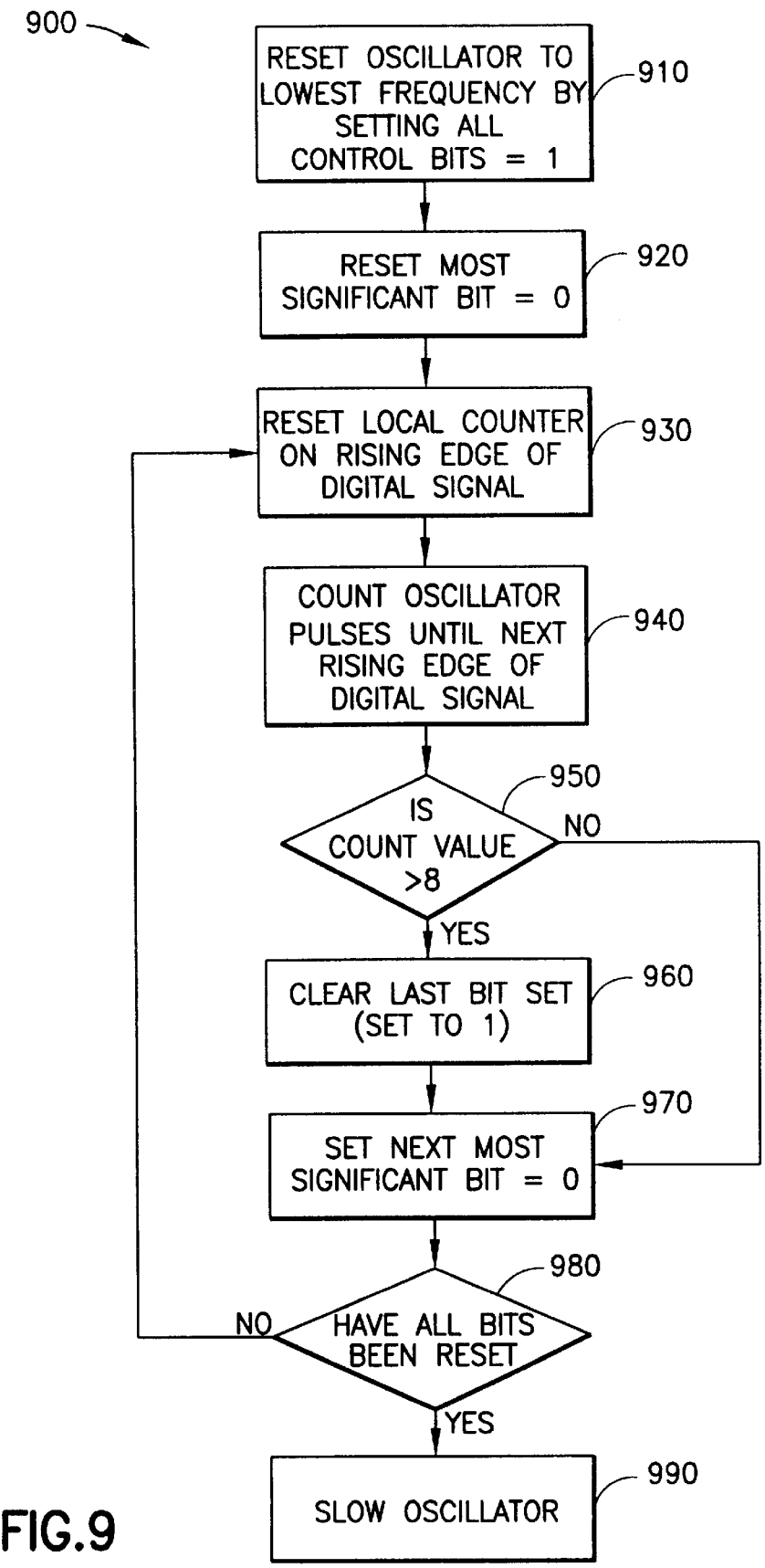
FIG. 9. A flow chart of a preferred method of calibrating the tag oscillator.

A flow chart 900 of the method of calibrating the tag oscillator is shown in FIG. 9. The tag resets the tag oscillator so that the tag oscillator frequency is the lowest possible frequency in step 910. In the example given by FIG. 5a and FIG. 5b, all nodes 120–124 would be set high so that only low current charges capacitor section 106. The most significant bit is then reset to 0 in step 920. The local counter 200 is reset to zero on the rising edge of the steadily modulated RF field sent out by the base station in step 815 of FIG. 8. (It is clear to one skilled in the art that falling edges could also be used, or any other regular transitions.) The local counter then counts pulses on line 102 in step 940 until the next rising edge of the steadily modulated RF field sent out from the base station. If the count value is greater than 8 (ie 9 or greater), the decision step 950 sends the system to step 960, where the last bit which was reset to zero is set back to one. (The oscillator is running too fast, and has to be slowed down. Because the control devices are p-FETs in the embodiment described, a logic level 1 is used to turn them off.). If the count is less than 9, the oscillator is running slow, and the system skips from step 950 to 970 to reset the next significant bit to zero. If all the control bits have not been reset, the system then decides at step 980 to return to step 930 to measure again whether the oscillator is running fast or slow compared to the base station modulation frequency, and the process is repeated in order from the most significant bit to the least significant bit until all nodes 120–124 in FIG. 5a are set correctly so that the tag oscillator frequency is just under 9 times the base station modulation frequency. Of course, it is clear to one skilled in the art that the count value could be more or less than 8 for the tag to calibrate the tag oscillator with respect to the base station modulation frequency. When all the bits have been reset (and possibly set again to 1), the system moves to step 990 and optionally reduces the tag oscillator frequency so that it is surely less than 9 times the base station modulation frequency.

Throughout the rest of the data stream, the settings on nodes 120–124 remain fixed. However, the phase reset signal 116 continues to be generated to maintain synchronization during the base station to tag data transmission.

Note that the phase reset signal 116 is not generated while the tag is writing data to the tag memory or while the tag is transmitting data to the base station. During these operations, the base station transmits unmodulated RF power, and the tag clock section 40 is free running at the calibrated frequency which is determined by the settings on nodes 120–124.

It will be apparent to one skilled in the art that circuits equivalent to those disclosed herein may be used for the purposes stated herein. In particular, the equivalent n-FET and p-FET circuits are anticipated by the inventors.

We claim:

1. A passive radio frequency (RF) transponder (tag) for receiving an RF signal from a base station, comprising;
   a tag antenna for receiving the RF signal fron the base station the RF signal having a carrier frequency;
   a tag rectification power supply connected to the tag antenna;
   a tag logic section and a tag memory section the tag logic section and the tag memory section receiving power only from the tag antenna through the tag rectification power supply;
   a receiver section connected to the tag antenna; and
   a tag oscillator connected to the receiver section, the tag oscillator having a plurality of possible discrete frequencies of oscillation, the tag oscillator having a tag oscillation frequency much less than the carrier frequency, the tag oscillator frequency used to determine a tag modulation frequency of an RF signal backscattered from the tag antenna, the tag oscillation frequency determined by the RF signal sent from the base station.

2. The RF tag of claim 1, where the RF signal is modulated at a modulation frequency $f_1$, and the frequency of oscillation of the tag oscillator is determined by $f_1$.

3. The RF tag of claim 2, where the RF signal is amplitude modulated at a modulation frequency $f_1$.

4. The RF tag of claim 2, where the RF signal is frequency modulated at a modulation frequency $f_1$.

5. The RF tag of claim 2, where the RF signal is phase modulated at a modulation frequency $f_1$.

6. The RF tag of claim 1, wherein the tag oscillator further comprises;
   a current source section;
   a capacitor section, the capacitor section charged from the current source section;
   a voltage comparator section, the voltage comparator section comparing the voltage across the capacitor section to a preset comparison voltage; and
   a switch, the switch discharging the capacitor section when the voltage across the capacitor section reaches the preset comparison voltage.

7. The RF tag of claim 6, where the current source section comprises a plurality of defined current sources, at least one of the plurality of defined current sources being controlled to charge the capacitor section in response to the RF signal sent from the base station.

8. The RF tag of claim 7, where at least one of the defined current sources is a defined current transistor in series with a transistor switch.

9. The RF tag of claim 6, where the capacitor section source comprises a plurality of capacitances connected in parallel, at least one of the plurality of capacitances being controlled to receive current or not to receive current from the current source section in response to the RF signal sent from the base station.

10. The RF tag of claim 6, where the comparator section source further comprises a plurality of defined current sources for delivering current to a voltage comparison circuit, at least one of the plurality of defined current sources being controlled to deliver current in response to the RF signal sent from the base station.

11. The RF tag of claim 1, where the tag oscillator uses less than 500 microamperes of current.

12. The RF tag of claim 11, where the tag oscillator uses less than 1 microampere of current.

13. A method of setting a tag oscillation frequency of a tag oscillator of a passive RF tag comprising;
   a) receiving an RF signal from a base station, and;
   b) adjusting the tag oscillation frequency in response to the RF signal from the base station, wherein the tag oscillation frequency is much less than a carrier frequency of the RF signal, and wherein the tag oscillation frequency is used to determine a tag modulation frequency of an RF signal backscattered from the tag.

14. The method of setting an oscillation frequency of claim 13, where the RF signal is modulated at a modulation frequency $f_1$ and the oscillation frequency is set as a function of $f_1$.

15. The method of claim 14, where the RF signal is amplitude modulated at a modulation frequency $f_1$.

16. The method of claim 14, where the RF signal is frequency modulated at a modulation frequency $f_1$.

17. The method of claim 14, where the RF signal is phase modulated at a modulation frequency $f_1$.

18. The method claim 14, where the tag counts the number of tag oscillator pulses in one period of the base station modulation frequency, and adjusts tag oscillator frequency so that the number is approximately equal to a preset number.

19. A method of setting an oscillation frequency of a tag oscillator of a passive RF tag, where the tag adjusts the oscillator frequency according to the following steps;

a) setting the tag oscillator so that the tag oscillation frequency is the lowest possible frequency by setting all control bits equal to one;
   b) resetting the most significant bit equal to zero;
   c) resetting a local counter of tag oscillator pulses on a rising edge of the steadily modulated RF field sent out by the base station;
   d) counting pulses of the tag oscillator until the next rising edge of the steadily modulated RE field sent out from the base station;
   e) if the count value is greater than a preset number, resetting the local counter, setting the last bit reset to one, resetting the next significant bit to zero, and returning to step (c);
   f) if the count value is less than the preset number, resetting the local counter, resetting the next significant bit to zero, and returning to step (c); and
   g) continuing until all control bits have been set or reset and the count value is approximately equal to the preset number.

20. The method claim 19, where the tag further adjusts the oscillator frequency in the additional step;

h) slowing the tag oscillator so that the count value is definitely less than the preset number, and definitely more than the preset number minus one.

21. The method claim 19, where the tag further adjusts the tag oscillator in the additional step of; resetting the tag oscillator phase on the rising edge of the steadily modulated RF field sent out by the base station.

22. A system for sending and receiving modulated RF signals, comprising;

a base station for sending modulated RF signals, the RF signals having a carrier frequency; and
   at least one passive RF tag for receiving the RF signals, the RF tag comprising a tag antenna for receiving the RF signal from the base station, a tag receiver section connected to the tag antenna; and a tag oscillator connected to the tag receiver section, the tag oscillator having a tag oscillation frequency much less than the carrier frequency, the tag oscillation frequency used to determine the a modulation frequency of an RF signal backscattered from the tag antenna, the tag oscillator frequency determined by the Rf signals sent by the base station.

23. The system of claim 22, where the base station sends RF signals modulated at a modulation frequency $f_1$, and the frequency of oscillation of the tag oscillator is determined by the modulation frequency $f_1$.

24. The system of claim 23, where the RF signal is amplitude modulated at a modulation frequency $f_1$.

25. The system of claim 23, where the RF signal is frequency modulated at a modulation frequency $f_1$.

26. The system of claim 23, where the RF signal is phase modulated at a modulation frequency $f_1$.

27. The system of claim 22, where the base station further comprises a computer for receiving and sending data from and to the tag.

28. A passive radio frequency (RF) transponder (tag) for receiving an RF signal from a base station, comprising;

a tag antenna for receiving the RF signal from the base station, the RF signal having a carrier frequency;
   a receiver section connected to the tag antenna;
   a tag rectification power supply connected to the tag antenna;
   a tag logic section and a tag memory section, the tag logic section and the tag memory section receiving power only from the tag antenna through the tag rectification power supply; and
   a tag oscillator connected to the receiver section, the tag oscillator having a tag oscillation frequency much less than the carrier frequency, the tag oscillation frequency used to determine a tag modulation frequency of an RF signal backscattered from the tag antenna, the tag oscillation frequency determined by the RF signal sent from the base station.

* * * * *